United States Patent
Hong

(10) Patent No.: US 7,185,870 B2
(45) Date of Patent: Mar. 6, 2007

(54) POSITIONING MECHANISM FOR REFLECTORS IN SCANNER

(75) Inventor: Ming-De Hong, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 629 days.

(21) Appl. No.: 10/734,256

(22) Filed: Dec. 15, 2003

(65) Prior Publication Data

US 2004/0182985 A1 Sep. 23, 2004

(30) Foreign Application Priority Data

Mar. 7, 2003 (TW) .............................. 92203500 U

(51) Int. Cl.
*B60R 1/02* (2006.01)

(52) U.S. Cl. ...................................... 248/466; 248/694
(58) Field of Classification Search ................ 248/466, 248/475.1, 476, 694; 359/871; 235/462.32, 235/454, 462.36, 462.37
See application file for complete search history.

(56) References Cited

U.S. PATENT DOCUMENTS

| 4,984,882 | A | | 1/1991 | Boyd | |
|---|---|---|---|---|---|
| 5,301,060 | A | * | 4/1994 | Niikawa et al. | ............ 359/218 |
| 5,493,453 | A | * | 2/1996 | Yamazaki et al. | .......... 359/871 |
| 5,712,719 | A | * | 1/1998 | Hama | ......................... 359/207 |
| 6,098,947 | A | | 8/2000 | Kerschner | |

* cited by examiner

*Primary Examiner*—Ramon O Ramirez
(74) *Attorney, Agent, or Firm*—Birch, Stewart, Kolasch & Birch, LLP

(57) ABSTRACT

A positioning mechanism for reflectors in a scanner is capable of tool-less assembling and precise positioning. The mechanism mainly includes a carrier, some angular positioning members, and resilient arms. The carrier is a plate-like member for mounting an optical assembly. The angular positioning members are mounted on the carrier and formed with cutoffs of supporting surfaces. The resilient arms extend from the carrier to outer sides of the supporting surfaces of the angular positioning members. The clearance of the end of resilient arm to the supporting surface is less than the thickness of the reflector to position the reflector simply, easily and precisely.

18 Claims, 4 Drawing Sheets

POSITIONING MECHANISM FOR REFLECTORS IN SCANNER

This Nonprovisional application claims priority under 35 U.S.C. 119(a) on Patent Application No(s). 092203500 filed in TAIWAN on Mar. 7, 2003, the entire contents of which are hereby incorporated by reference.

BACKGROUND OF THE INVENTION

1. Field of the Invention

The invention generally relates to a positioning mechanism, and in particular relates to a positioning mechanism for reflectors in a scanner.

2. Related Art

In an image scanner, the document or picture to be scanned is illuminated partially and sequentially by a light source. The reflective light is then collected by detectors via some reflectors, transformed into digital signals and processed into digital image through a computer, a printer, or the like. The positions of the reflectors are quite important to the image acquirement. When a reflector is not in position, the reflective light cannot correctly come to the detectors.

In a conventional scanner, the reflectors are mainly positioned by injection-molded plastic parts, only resilient members, or resilient members incorporated with sheet metal parts.

The injection-molded plastic parts are like those disclosed in U.S. Pat. No. 4,984,882. However, because of the material characteristics and injection limitation, the precision of plastic part is not good enough.

The only resilient members are like that disclosed in U.S. Pat. No. 6,098,947. The resilient member is made of metal and fixed at its rim by hooks or screws. Though the resilient member is easy to be mounted, it is mounted on a carrier of optical module of the scanner that is made of imprecise injection-molded plastic. Therefore, the positioning is unsatisfied.

A better way of positioning is to mount an angular fixing plate on the carrier first. The angular fixing plate includes a supporting surface for the reflector to mount to. Then, the reflector is fixed by a resilient member. Because the angular fixing plate is made of metal, it provides a better positioning of the reflector. However, the arrangement uses more components and needs more complicated assembly process and higher manufacturing cost that are disadvantages to the price and competition. Furthermore, in order to simplify assembly process, the assembling of reflector is preferred of a tool-less operation.

SUMMARY OF THE INVENTION

The object of the invention is to provide a positioning mechanism for reflectors in a scanner. The mechanism is simple, can be tool-less assembled, and meets the precision requirement.

A positioning mechanism for reflectors in a scanner according to the invention mainly includes a carrier, some angular positioning members, and resilient arms. The carrier is a plate-like member for mounting an optical assembly. The angular positioning members are mounted on the carrier and formed with cutoffs of supporting surfaces. The resilient arms extend from the carrier to outer sides of the supporting surfaces of the angular positioning members. The clearance of the end of resilient arm to the supporting surface is less than the thickness of the reflector to fasten the reflector.

The function of the invention is to simplify the structure of an optical module of a scanner by using resilient arms to hold reflectors on a carrier. The invention not only achieves tool-less assembling, improves positioning accuracy of reflectors, but also reduces component cost and manufacturing time.

The mechanism of the invention replaces conventional resilient members with resilient arms to simplify the structure, achieve tool-less assembling, reduce the component cost and process time, and improve the precision of reflector positioning.

BRIEF DESCRIPTION OF THE DRAWINGS

The invention will become more fully understood from the detailed description given herein below. However, this description is for purposes of illustration only, and thus is not limitative of the invention, wherein.

DETAILED DESCRIPTION OF THE INVENTION

Figure 1:
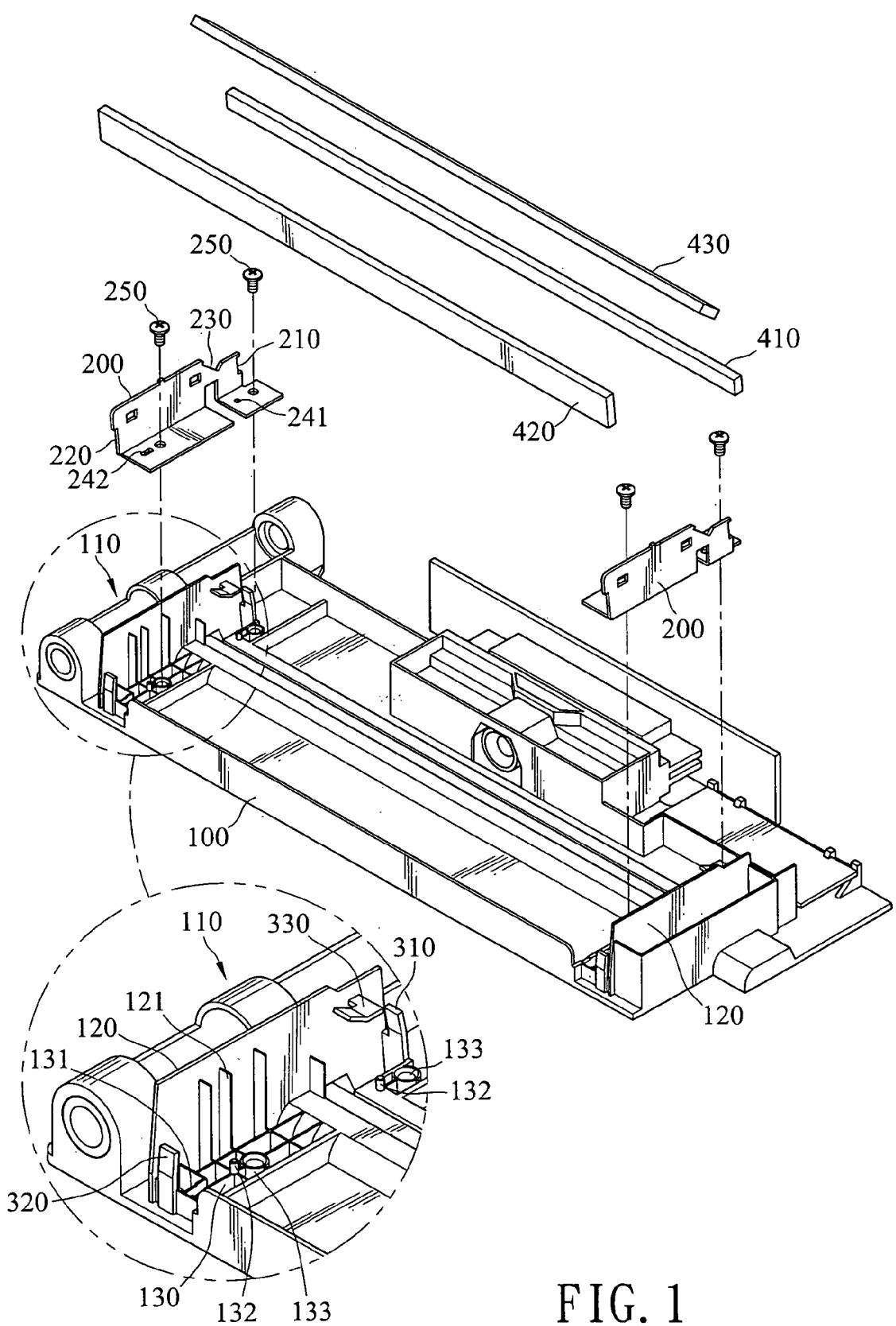
FIG. 1 is an exploded view of a preferred embodiment of the invention.
Figure 2:
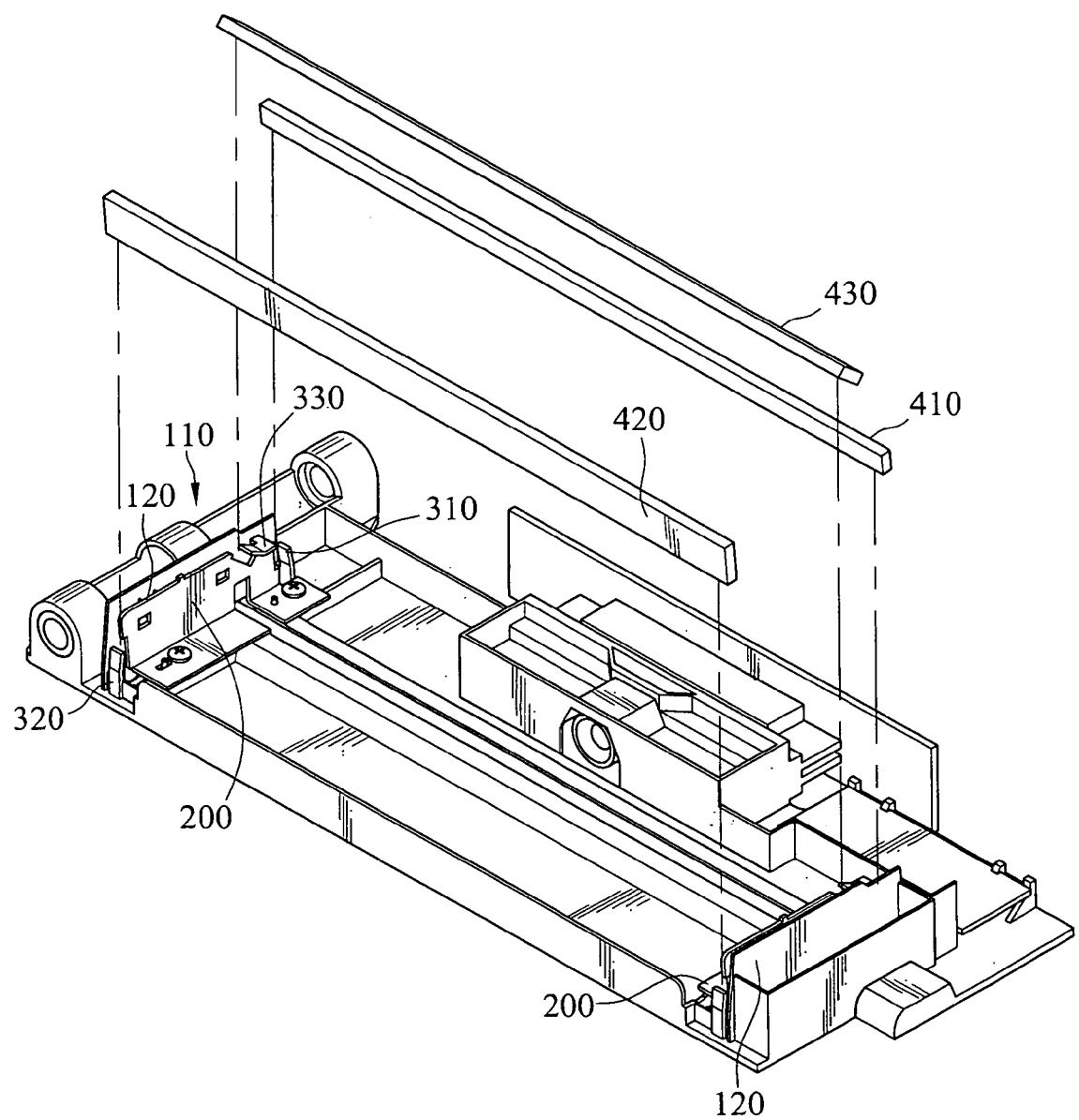
FIG. 2 is a partial assembly view of a preferred embodiment of the invention.

As shown in FIGS. 1 to 5, a preferred embodiment of positioning mechanism for reflectors in a scanner according to the invention mainly includes a carrier 100, two angular positioning members 200, and three resilient arms 310, 320, 330 extending from the carrier 100. The resilient arms 310, 320, 330 fix three rectangular-section reflectors 410, 420 and 430 to the carrier 100 via the angular positioning members 200.

The carrier 100 in this embodiment is a plate-like member made by plastic injection molding. As shown in left sides of FIGS. 1 to 3, there is a guide 110 for mounting the carrier 100 and carrying an optical module (not shown in the drawing) to a scanner. The optical module mainly includes lamps, sensors and control board that are not the main point of the invention and will not be described herein. On both sides of the carrier 100, there are two walls 120 standing upwards. Each wall 120 has some vertical ribs 121 perpendicular to the wall 120. One or more ribs 130 have U-shaped cut-offs 131. Some other ribs 130 have two studs 132 and two bosses 133.

The angular positioning members 200 in the invention are L-shaped plates mounted via screws 250 on the bosses 133 aside the wall 120 of the carrier 100. The wall 120 is strengthened by the ribs 120 to support the angular positioning members 200 firmly. The ribs 121 keep the angular positioning members 200 a distance from the wall 120 and prevent the reflector from slipping out after being assembled. Each angular positioning member 200 is formed with two via holes 241 and 242 correspondent to studs 132 of the carrier-100. The via hole can be a hole, such as the via hole 241, a little bit larger than the stud 132; or a slot, such as the via hole 242, for adjusting the angle of the angular positioning members 200 on the carrier 100. At the edge of the angular positioning members 200, there are cutoffs of first supporting surface 210, second supporting surface 220 and third supporting surface 230 for supporting a first reflector 410, a second reflector 420 and a third reflector 430. Practically, the material of the angular positioning members 200 is not limited to metal but capable of any available material of higher precision. The positioning and fastening method is not limited to bosses and screws but applicable of other manners.

The resilient arms 310, 320, 330 extend from the carrier 100 to outer sides of the supporting surfaces 210, 220, 230 of the angular positioning members 200. The clearance of the end of resilient arms 310, 320, 330 to the supporting surfaces 210, 220, 230 is less than the thickness of the reflectors 410, 420, 430 to fasten the reflectors. Practically, the shape and position of the receiving portions, i.e., the correspondence of the resilient arms and the supporting surfaces, is according to the shape of the reflectors and not limited to the embodiment.

Figure 3:
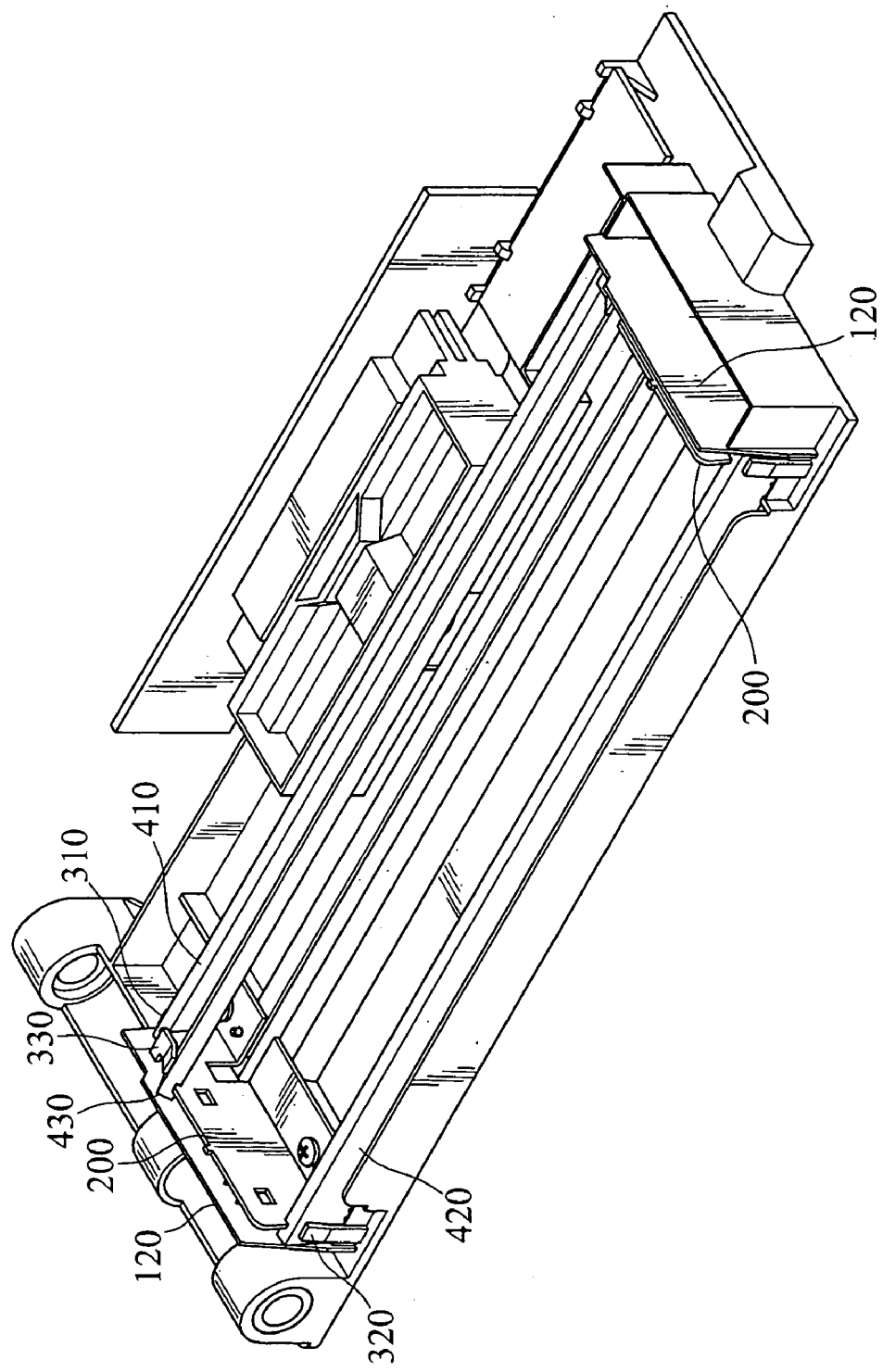
FIG. 3 is an assembly view of a preferred embodiment of the invention.
Figure 4:
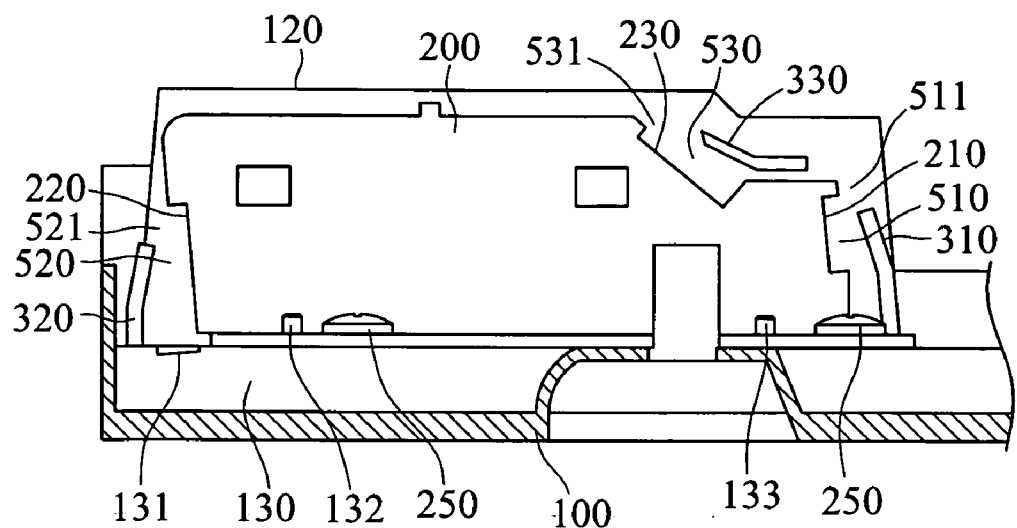
FIG. 4 is a partial sectional view of a preferred embodiment of the invention before assembling the reflectors.
Figure 5:
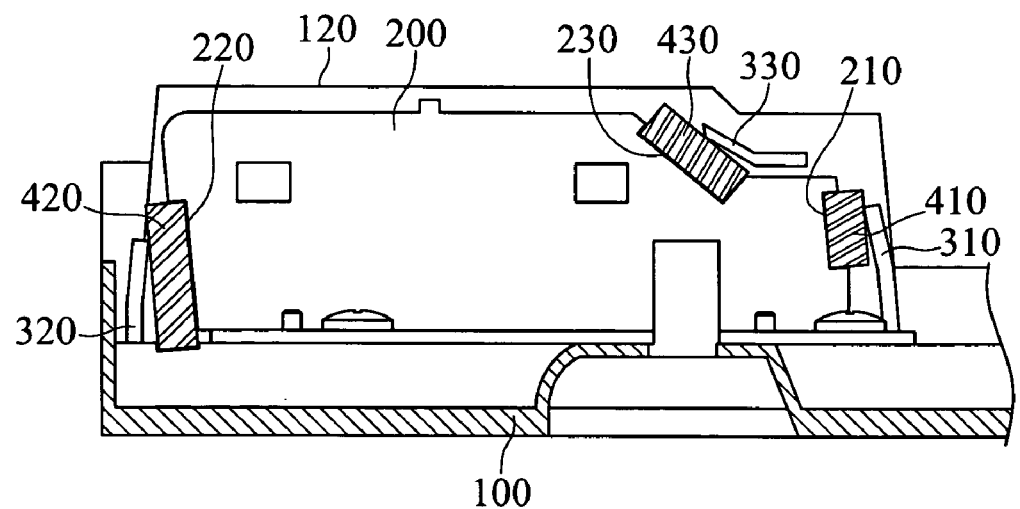
FIG. 5 is a partial sectional view of a preferred embodiment of the invention after mounting the reflectors.

Referring to FIG. 1 and FIG. 4, in the embodiment, the first supporting surface 210 of the angular positioning member 200 is substantially U-shaped. The first resilient arm 310 substantially extends from top of the carrier 100 and has an end bending toward the first supporting surface 210 to have a clearance between the end and the first supporting surface less than the thickness of the first reflector 410. The first resilient arm 310 and the first supporting surface 210 form a first receiving portion 5 10 having a first opening 511 to receive the first reflector 410 inserted through it. The resilient arm 310 then presses the reflector 410 toward the first supporting surface 210 and positions it precisely as shown in FIG. 3 and FIG. 5. The assembling is tool-less that no tool is required.

The assembling of the second reflector 420 and the third reflector 430 are similar to that of the first reflector 410. However, the position and shape of the second supporting surface 220, correspondent to the second reflector 420, is substantially L-shaped. The second supporting arm 320 is similar to the first supporting arm 310. In accompany with a cutoff 131 formed on a rib 130 of the carrier 100, a second receiving portion 520 with a second opening 521 is formed for receiving the second reflector 420, as shown in FIG. 3 and FIG. 5. The arrangement gives examples that the supporting surface of the angular positioning member is not limited to U-shape; the supporting surface can be at least of a surface in accompany with surfaces of other portions, such as resilient arm and cutoff (in rib) of carrier in the embodiment.

As shown in FIG. 3 and FIG. 5, the third reflector 430 is mounted with an angle at a higher position. A U-shaped third supporting surface 230 is formed on top edge of the angular positioning member 200 with a tilted angle. The third resilient arm 330, different from the first and second resilient arms 310, 320, is extended horizontally from the wall 120 and tilted at its end to have an angle toward the third supporting surface 230. A third receiving portion 530 with a third opening 531 is formed for receiving the third reflector 430.

Please note that the shape of the resilient arm is not limited as long as it provides the positioning function. In addition, in order to receive the reflector easily, the end of the resilient arm can be formed with a slope as the third resilient arm 330 shown in FIG. 4 or FIG. 5. The bending or not and the bending angle of the end of the resilient arm depend on the angles of the resilient arm and the angular supporting member. It can be flexibly modified but to keep the clearance of the arm tip to the supporting surface less than the reflector thickness.

In conclusion, the invention provides angular positioning members having precise supporting surfaces, and resilient arms extended from the carrier, for positioning the reflectors precisely and easily without the need of any assembling tool.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning mechanism for reflectors in a scanner, comprising:
   a carrier, substantially a plate-like member, for carrying an optical module;
   at least two angular positioning members, mounted on both sides of said carrier and each formed with at least a cutoff of supporting surface for at least a reflector to fit in; and
   at least two resilient arms, extending from said carrier to outer sides of said supporting surfaces of said angular positioning members, thereby forming a receiving portion between said resilient arms and said angular positioning members, a clearance between an end of said resilient arm and said supporting surface being less than thickness of said reflector.

2. The positioning mechanism according to claim 1 wherein said resilient arm is a blade with rectangular section.

3. The positioning mechanism according to claim 1 wherein the end of said resilient arm bends toward said angular positioning member.

4. The positioning mechanism according to claim 1 wherein the end of said resilient arm bends opposite to said angular positioning member.

5. The positioning mechanism according to claim 1 wherein said resilient arm is L-shaped.

6. The positioning mechanism according to claim 1 wherein said end of said resilient arm is formed with a slope for guiding said reflector to fit in.

7. The positioning mechanism according to claim 1 wherein two walls are formed on both sides of said carrier and at least one of the resilient arms is formed on said walls.

8. The positioning mechanism according to claim 1 wherein two walls are formed on both sides of said carrier, and said walls are reinforced with a plurality of perpendicular ribs.

9. The positioning mechanism according to claim 1 wherein said carrier and said resilient arms are formed by injection-molded plastic.

10. The positioning mechanism according to claim 1 wherein said carrier is formed with a plurality of ribs, at least one of the ribs thereof has a U-shaped cutoff for one of the surfaces of the reflector to lean on.

11. The positioning mechanism according to claim 10 wherein said angular positioning member is formed with at least a L-shaped cutoff for positioning said reflector in accompany with said U-shaped cutoff of said rib.

12. The positioning mechanism according to claim 1 wherein said angular positioning members are fixed to said carrier through screws.

13. The positioning mechanism according to claim 1 wherein each of said angular positioning members includes at least a via hole for receiving at least a stud of said carrier.

14. The positioning mechanism according to claim 13 wherein said via hole is slot-like for adjusting position of said angular positioning member.

15. The positioning mechanism according to claim 1 wherein said supporting surface is U-shaped.

16. The positioning mechanism according to claim 1 wherein said angular positioning member is L-shaped.

17. The positioning mechanism according to claim 1 wherein said supporting surface on said angular positioning member is made of metal.

18. The positioning mechanism according to claim 1 wherein said reflectors are blades with rectangular sections.

* * * * *